Oct. 2, 1928.
C. S. HALL
AIRCRAFT
Filed April 27, 1922 4 Sheets-Sheet 2
1,686,130
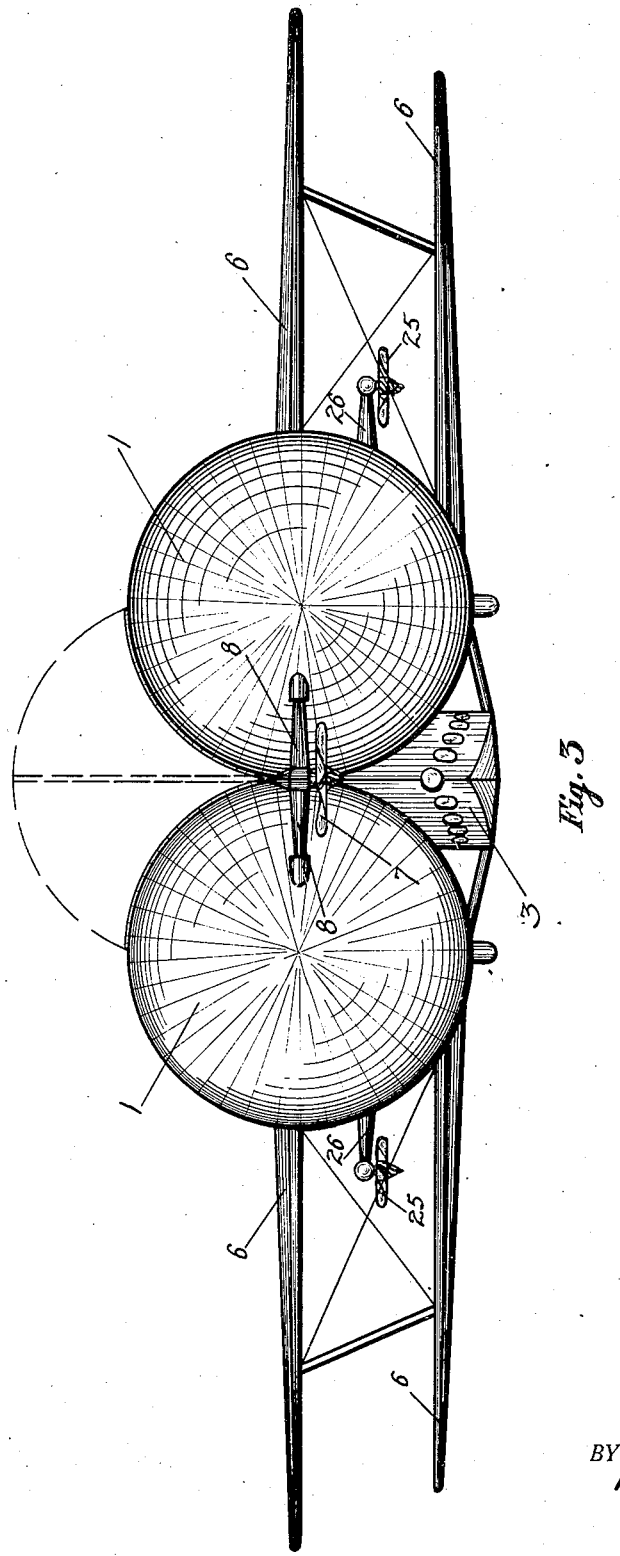
Charles S. Hall.
INVENTOR.
BY David N. Clark
ATTORNEYS.

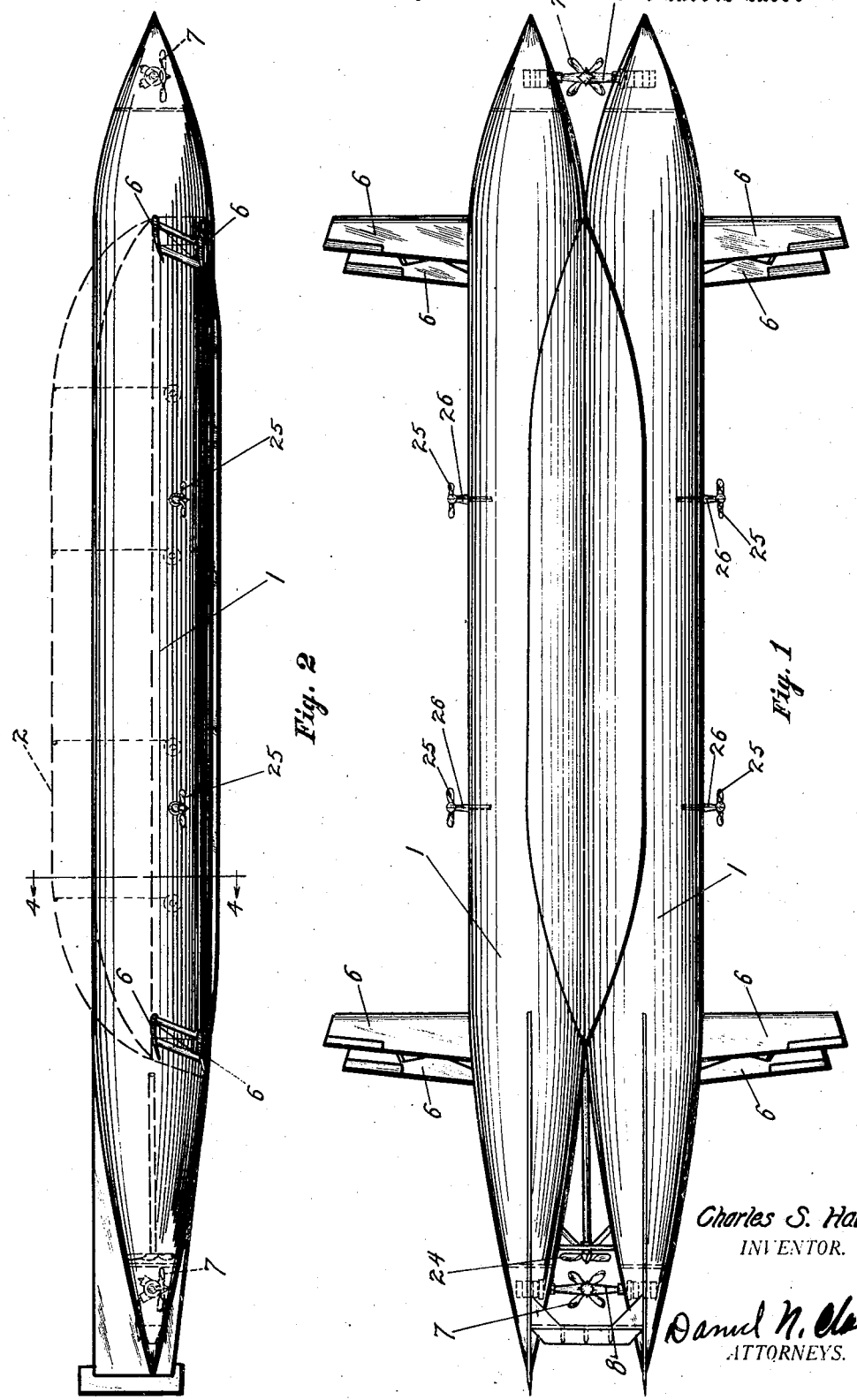

Oct. 2, 1928.

C. S. HALL 1,686,130

AIRCRAFT

Filed April 27, 1922     4 Sheets-Sheet 3

Charles S. Hall.
INVENTOR.

BY Daniel N. Clark
ATTORNEYS.

Patented Oct. 2, 1928.

1,686,130

UNITED STATES PATENT OFFICE.

CHARLES S. HALL, OF LOS ANGELES, CALIFORNIA.

AIRCRAFT.

Application filed May 16, 1922, Serial No. 561,513. Renewed February 9, 1926.

My invention relates to aircraft embodying the combination of lighter-than-air and heavier-than-air devices and has for one of its objects to provide a means whereby the rigidity of the gas containers may be increased by arranging cylindrical gas containers with conical ends, in parallel juxtaposition upon a horizontal plane with respect to the normal line of flight, and with their longitudinal axis paralleling each other, thus forming an intersticing space, or crevice, between the outer walls thereof wherein an auxiliary gas container with a flexible covering may be placed; this auxiliary gas container being used for the purpose of increasing the buoyancy of the aircraft and to facilitate both a take-off and a landing by being either inflated or deflated, as may be desired.

Another object of my invention is to provide a means, at both the bow and the stern of the craft and between the dual conical ends thereof, whereby revolvably arranged frames with propellers mounted thereon may be placed and used to facilitate a landing.

Another object is to provide an aircraft having revolvably arranged frames with propellers operatively mounted thereon in such a way that they can be swung at any described angle paralleling the sides of the aircraft.

Another object of my invention is to provide a driving means for aircraft of the dual type wherein such driving means comprised bodily rotatable propellers arranged between the gas containers.

Another object is to provide an aircraft including a main and an auxiliary gas container wherein the auxiliary gas container covering, when not in use, and when deflated, may be folded against the main container.

Having thus briefly described the objects of my invention I will now refer to the drawings and to the reference numbers made thereon.

Figure 1 is an assembled view of the aircraft looking from a position above the same, showing the cylindrical gas containers held in a parallel position.

Figure 2 is a side elevation showing, by dotted lines, the inflated auxiliary gas container hereinafter described.

Figure 3 is a front elevation with the dotted lines showing the relative position of the inflated auxiliary gas container.

In carrying out my invention the cylindrical gas containers 1 are provided, as shown in Figures 1 and 2, with a suitable element made impervious to gas. These cylindrical gas containers are placed parallel to each other, as shown in Figure 1, and rigidly secured together. In this juxtaposition, a crevice will be formed between them, as shown, in which collapsible auxiliary gas container 2 is arranged, as shown in Figure 1 in plan view, in Figure 3 in front elevation, and in Figure 4 in cross-section.

Figure 4:
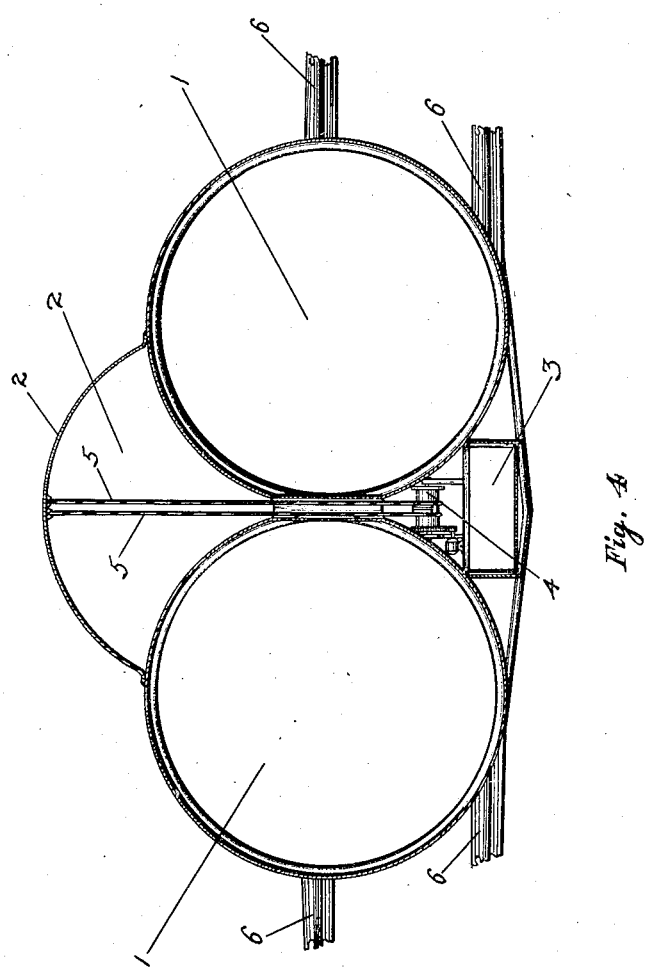
Figure 4 is a cross-sectional view of the aircraft, taken on line 4—4, as shown in Figure 2, looking in the direction indicated by the arrows.

Now it will be seen that the auxiliary gas container may be inflated and deflated by any suitable means, and that when inflated it will be in the position shown in cross-section in Figure 4, and in dotted lines as shown in Figure 3, while, in a state of deflation, it will be fitted into the crevice formed by the outer walls of the cylindrical members 1, as shown in Figure 3.

In the lower crevice between the said cylindrical containers 1, in the positions shown in Figures 2, 3, and 4, cabins, as well as suitable landing gears, not herein shown, are placed. By means of a suitable mechanical arrangement, such as windlass 4 and cables 5, which may be wound around windlass 4, as shown in Figure 4, the auxiliary gas containers may be brought down into a taut position within the crevice between the cylindrical gas containers 1. The said windlass 4 may be operated by any suitable mechanical device not shown, and the buoyant gas for the inflation of the auxiliary herein, may be injected into the space delineated by its flexible covering by any suitable mechanical means, such as tubes, connected therewith, through which the said gas may be pumped, or permitted to flow, into said container, details of which are not herein shown.

Figures 5, 6:
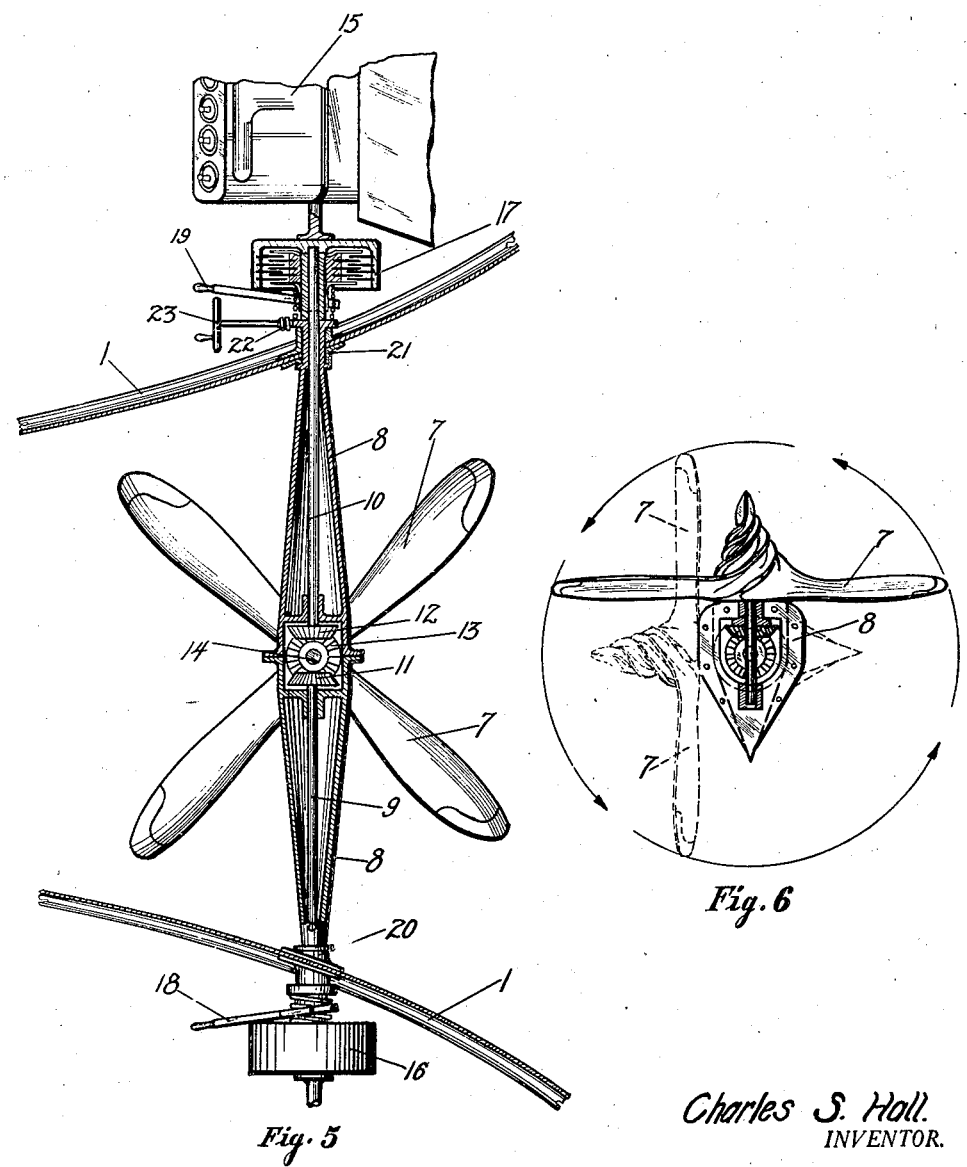
Figure 5 is a fragmentary detail cross-section view of the revolvably arranged propeller between the ends of the cylindrical gas containers.
Figure 6 is a detail taken at 90° angle to that of Figure 5 showing the propeller swung in a manner to produce an upward thrust, and by dotted lines, a position producing a backward thrust.

Propellers 7 are rotatably mounted upon pivotal frames 8, as shown in Figures 1, 2, 3, 5, and 6, which frames have their longitudinal axes on a horizontal plane with, and are arranged transversely to, the normal line of flight. Within said frame 8, shafts 9 and 10 are operatively arranged to rotate propeller 7 by means of suitable gears 11 and 12 engaging gear 13 fixed upon shaft 14 of propeller 7, as shown in Figure 5. At either end of frame 8, and operatively arranged to shafts 8 and 9, suitable engines, such as shown in fragmentary section of engine 15, as shown in Figure 5, may be arranged and connected by means of clutches 16 and 17, by means of levers 18 and 19 in such a manner that either one or both of the engines can be engaged to rotate propeller 7. Frame 8 can be swung upon journals 20 and 21 by means of suitable worm-gear 22 by hand-wheel 23.

Suitable wings 6 are constructed on, and rigidly fixed to, the sides of the cylindrical gas containers as shown in Figures 1, 2, 3, and 4.

Now it will be seen that, by the juxtaposition of the said gas containers on longitudinal parallels, that the conical shaped ends thereof, as shown in Figures 1 and 2, will provide an appropriate space in both the bow and the stern of the aircraft, within which pivotally arranged propellers may be placed, centrally located upon the longitudinal center of the said aircraft, on a horizontal plane to the normal line of flight and on a revolvable frame arranged transversely to this normal line of flight whereby the said propeller 7 may be swung at an angle with respect to the said normal line of flight by which the thrust developed may be utilized in any desired direction upon the revolvable frame.

Now it will be seen that, in operation, when it is desired to take the aircraft into the air, after first having filled the cylindrical gas containers 1 with a buoyant element such as hydrogen, helium, or otherwise, and having similarly filled the auxiliary gas container until it assumes the position shown in Figure 4, in cross-section, thereupon, through suitable manual controls, the operator will cause propellers 7 to rotate on frames 8 which are turned at such an angle that the thrust derived from the propellers will assist the buoyant element confined within the cylindrical container, as well as in the auxiliary container, to lift the aircraft from the ground. When the aircraft is in the air, propeller 7, by means of revolvable frames 8, may be turned at an angle of 90° and, in conjunction with propeller 24, used as a means of propelling the aircraft in horizontal flight.

It will, of course, be noticed and understood that wings 6 will carry a portion of the weight of the air-craft while in horizontal flight, thereby permitting the deflation of the auxiliary gas container 2 and permitting the same to be receded into the position against the walls of the cylindrical containers as shown, in front-elevation, in Figure 3. It will be further understood that in making a landing the forward velocity of the aircraft may be reduced thereby causing the same to gradually descend and during all the time of this descent the velocity of such descent may be controlled by the use of engine power through the appropriate use of propeller 7 swung upon the revolvable frame 8 so as to hold the aircraft over any desired landing area, and also permitting the same to gently settle down thereon.

It will be further understood that as various air currents and winds tend to interfere with the making of landings, by the use of the devices and combinations here shown, the aircraft, while making a landing, can always be headed into the wind by means of the controls afforded through swinging propellers 7, thus greatly facilitating as well as safeguarding such landing.

Of course it is understood that various changes may be made in the arrangement, combination, association, coordination, and collocation of parts, devices and moving members, without departing from the spirit of this invention.

It is further understood that revolvable frames having propellers mounted thereon, may be arranged along the sides of the aircraft, as shown by propellers 25 and frames 26 in Figures 1, 2, and 3.

Having thus described my invention what I claim and for which I desire to secure Letters Patent, are as follows:

1. In an aircraft, the combination of; a plurality of cylindrical gas containers held together in parallel arrangement with respect to the normal line of flight arranged to provide an unobstructed V-shaped space between them; and a collapsible auxiliary gas container occupying said space, substantially as shown.

2. In an aircraft, the combination of; a plurality of gas containers held together parallel to the normal line of flight; a collapsible auxiliary gas container arranged between the aforesaid containers; and means operatively arranged to collapse the said auxiliary gas container, substantially as shown.

3. In an aircraft, the combination of; a plurality of cylindrical gas containers held together parallel to the normal line of flight; and a collapsible auxiliary gas container arranged between the said cylindrical containers with means operatively arranged to collapse the said auxiliary container.

4. In an aircraft, the combination of; a plurality of cylindrical gas containers held together in an arrangement parallel to the normal line of flight, the said containers having conical shaped ends; and propellers arranged upon revolvable frames, the said frames arranged between and connecting the ends of the said cylindrical containers, substantially as described.

5. In an aircraft, the combination of; a plurality of cylindrical gas containers held together in an arrangement parallel to the normal line of flight, the said gas containers having conical shaped ends; propellers operatively mounted upon revolvable frames arranged between the ends of the said cylindrical containers; a collapsible auxiliary gas container arranged between the said cylindrical containers; and means operatively arranged to collapse the said auxiliary container, substantially as shown.

6. In an aircraft, the combination of; a plurality of cylindrical gas containers held together in an arrangement parallel to the normal line of flight, the said containers having conical shaped ends; revolvable frames connecting the ends of the said cylindrical gas containers; propellers operatively mounted in the said frames; revolvable frames outwardly extended from the sides of the said aircraft; propellers operatively mounted upon the said frames last mentioned; an auxiliary gas container arranged within a crevice formed by the cylindrical containers; and cables operatively attached to the said auxiliary container to collapse the same, substantially as shown.

7. In an aircraft, the combination of; a plurality of cylindrical gas containers held together in an arrangement parallel to the normal line of flight, the said gas container having conical shaped ends; propellers operatively mounted upon revolvable frames arranged between the ends of said containers; revolvable frames with propellers operatively mounted thereon extending from the sides of the said cylindrical containers; and wings arranged on the side of the said cylindrical containers, substantially as shown.

8. In an aircraft, the combination of; a plurality of cylindrical gas containers held together in an arrangement parallel with the normal line of flight, the said containers having conical ends; revolvable frames arranged between the said ends, with propellers mounted upon the said frames and operatively arranged therein; and wings mounted upon the sides of the said aircraft, and with revolvable frames outwardly extended upon the sides of the said aircraft with propellers operatively arranged within the said frames, substantially as described.

9. In an aircraft, the combination of; a plurality of cylindrical gas containers held together parallel with their longitudinal centers; propellers mounted upon revolvable frames arranged between and connecting the ends of the said containers; and a collapsible auxiliary gas container arranged between the said cylindrical containers, substantially as disclosed.

10. In an aircraft, the combination of; a plurality of cylindrical gas containers held together in an arrangement parallel with their longitudinal centers, the said containers having conical ends; a collapsible auxiliary gas container arranged within the crevice formed between the cylindrical containers, and cables associated with the said collapsible container forming means for collapsing the same, substantially as disclosed.

11. In an aircraft, the combination of; a plurality of cylindrical gas containers, the said containers having conical shaped ends and held together in an arrangement parallel with their longitudinal centers and parallel with the normal line of flight; propellers operatively mounted upon revolvable frames arranged between the said ends; wings arranged upon the sides of the said aircraft; propellers operatively mounted upon revolvable frames outwardly extending from the sides of the said aircraft; a collapsible auxiliary gas container arranged within the crevice formed between the said cylindrical containers; and cables operatively arranged to collapse the said auxiliary gas container, substantially as disclosed.

12. In an aircraft, a sustaining body, a pair of spaced supports on said body, a hollow member mounted on said spaced supports, a propeller mounted on said member, a shaft for said propeller, said shaft extending at approximately right angles to said member, said shaft being supported in a plurality of bearings on said member, a pair of drive shafts for said propeller shaft, said drive shafts extending at approximately right angles to said propeller shaft and in opposite directions therefrom, means to impart rotation from said drive shafts to said propeller shaft, said propeller shafts being mounted in a plurality of bearings on said hollow member, means to drive said drive shafts and selective means for driving said propeller shaft from either one or both of said drive shafts, said hollow member being shiftable to shift the axis of said propeller shaft to thereby vary the direction of thrust of said propeller.

In testimony whereof I have signed my name to this specification.

CHARLES S. HALL.